(12) United States Patent
Georgiev

(10) Patent No.: US 10,671,797 B2
(45) Date of Patent: Jun. 2, 2020

(54) UNIFIED GRAPHICAL USER INTERFACE VIEWS THROUGH FRAME BREAK OUT

(71) Applicant: VMware, Inc., Palo Alto, CA (US)

(72) Inventor: Toni Georgiev, Sofia (BG)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 15/877,947

(22) Filed: Jan. 23, 2018

(65) Prior Publication Data

US 2019/0042546 A1 Feb. 7, 2019

Related U.S. Application Data

(60) Provisional application No. 62/541,563, filed on Aug. 4, 2017.

(51) Int. Cl.
*G06F 21/53* (2013.01)
*G06F 40/106* (2020.01)
*G06F 16/95* (2019.01)
*H04L 29/08* (2006.01)

(52) U.S. Cl.
CPC .......... *G06F 40/106* (2020.01); *G06F 16/95* (2019.01); *G06F 21/53* (2013.01); *G06F 2221/2149* (2013.01); *H04L 67/02* (2013.01)

(58) Field of Classification Search
CPC .................. G06F 17/212; G06F 21/53; G06F 2221/2149; G06F 40/106; G06F 16/95; H04L 67/02
See application file for complete search history.

(56) References Cited

U.S. PATENT DOCUMENTS

| | | | | |
|---|---|---|---|---|
| 6,662,341 | B1* | 12/2003 | Cooper | G06F 9/451 715/234 |
| 8,489,878 | B2* | 7/2013 | Isaacs | G06F 16/957 713/168 |
| 9,398,017 | B1* | 7/2016 | Nizametdinov | H04L 63/10 |
| 9,443,257 | B2* | 9/2016 | Dodda | G06Q 30/0277 |
| 9,576,301 | B1* | 2/2017 | Sripracha | G06F 21/44 |
| 9,900,367 | B2* | 2/2018 | Branton | H04L 67/02 |
| 10,031,898 | B2* | 7/2018 | Jaquish | H04L 41/22 |
| 10,216,373 | B2* | 2/2019 | Nakano | G06F 3/0484 |
| 2012/0101907 | A1* | 4/2012 | Dodda | G06Q 30/0277 705/14.73 |

(Continued)

OTHER PUBLICATIONS

Scoditti et al. "A new layout method for graphical user interfaces", 2009 IEEE Toronto International Conference Science and Technology for Humanity, 2009, pp. 642-647.*

(Continued)

*Primary Examiner* — Maikhanh Nguyen
(74) *Attorney, Agent, or Firm* — Patterson + Sheridan, LLP

(57) ABSTRACT

When executing a feature of a frame (HTML document), a web browser utilizes a method for adjusting the size of the frame. The method includes expanding the size of the frame to cover at least a portion of the area of the interface components in response to a request for executing a feature of the frame. After expanding the size of the frame, the web browser executes the feature, wherein the feature renders a visual content within the expanded frame and disables the interface components within the expanded frame. Subsequently, responsive to another request, the web browser reduces the size of the expanded frame to an initial size of the frame.

18 Claims, 9 Drawing Sheets

(56) References Cited

U.S. PATENT DOCUMENTS

| | | | | |
|---|---|---|---|---|
| 2012/0173868 A1* | 7/2012 | Isaacs | .................. | G06F 16/957 |
| | | | | 713/150 |
| 2013/0167028 A1* | 6/2013 | Goldman | ........... | H04N 21/4425 |
| | | | | 715/716 |
| 2013/0191775 A1* | 7/2013 | Lawson | ................ | G06F 3/0482 |
| | | | | 715/784 |
| 2014/0223305 A1* | 8/2014 | Nakano | ................ | G06F 3/0484 |
| | | | | 715/719 |
| 2014/0337743 A1* | 11/2014 | Branton | ................. | H04L 67/02 |
| | | | | 715/738 |
| 2016/0335680 A1* | 11/2016 | Dodda | .............. | G06Q 30/0277 |

OTHER PUBLICATIONS

Yao et al. "Effective (frame-Based Strategy for Processing Dynamic Data in Embedded Browser", 2008 International Conference on Advanced Computer Theory and Engineering, 2008, pp. 538-542.*

* cited by examiner

```
function expandIframe() {
  var bodyRect = window.parent.document.body.getBoundingClientRect();
  var iframeRect = window.frameElement.getBoundingClientRect();

var top = iframeRect.top;
  var left = iframeRect.left;
  var right = bodyRect.right - iframeRect.right;
  var bottom = bodyRect.bottom - iframeRect.bottom;

window.document.body.style['position'] = 'absolute';
  window.document.body.style['top'] = top + 'px';
  window.document.body.style['left'] = left + 'px';
  window.document.body.style['right'] = right + 'px';
  window.document.body.style['bottom'] = bottom + 'px';

var ifr = window.frameElement;
  ifr['style']['position'] = 'fixed';
  ifr['style']['top'] = '0';
  ifr['style']['left'] = '0';
  ifr['style']['right'] = '0';
  ifr['style']['bottom'] = '0';
} function shrinkIframe() {
  window.document.body.style['position'] = 'initial';
  window.document.body.style['top'] = null;
  window.document.body.style['left'] = null;
  window.document.body.style['right'] = null;
  window.document.body.style['bottom'] = null;
}
```

FIG. 7

UNIFIED GRAPHICAL USER INTERFACE VIEWS THROUGH FRAME BREAK OUT

CROSS-REFERENCE TO RELATED APPLICATION(S)

This application claims the benefit of priority from U.S. Provisional Patent Application No. 62/541,563, filed Aug. 4, 2017, which is incorporated by reference herein.

BACKGROUND

Various approaches continue to be used for integrating a number of Hypertext Markup Language (HTML)-based graphical user interfaces ("UIs") into one coherent user interface, which may be referred to as "a single pane of glass." For example, in some cases, various development teams may build a number of UIs knowing that they would be later integrated into one overall application, where ideally all developers are contributing code, styles and components to the same code base using the same tools and frameworks.

This approach, however, does not scale well and it becomes harder to manage when more teams and products join the application suite. Very often, the individual application components need to be available in a standalone version as well and, therefore, they need to be able to be developed independently of the whole suite. Also, different teams use different UI libraries or different versions of the same library which makes integrating the individual UI components into one coherent UI even more difficult.

Another approach is to compose the UIs at deploy or run time into a single location, usually called a Hypertext Markup Language (HTML) shell. Using such an approach allows the various UIs to be developed and maintained individually but also integrated easily into one UI. Also, this approach allows separate development teams developing the various UIs to use any UI library they find necessary without being concerned about incompatibilities.

An example of the implementation of the latter approach is a standardized feature provided by HTML version 4.0, which is referred to as IFrame. IFrame provides a convenient way to embed various external content, including third party UIs or web pages, in a "sandboxed" IFrame area within an HTML shell. The sandboxed IFrame area is enabled by a sandboxing feature that provides security to the browser by limiting certain privileges the content contained within the IFrame area may have and restricting certain actions may perform. As an example, sandboxing may prevent JavaScript to execute in the content contained within the IFrame area (i.e., hereinafter the "IFramed content") and/or the IFramed content may be prevented from loading plugins, creating new windows, or rendering any visual context outside of its designated IFrame area.

SUMMARY

Herein described are one or more embodiments of a method of adjusting a size of a frame (HTML document) within a webpage having a shell with interface components that are displayed in an area outside the frame. The method includes, responsive to a first request for executing a feature of the frame, expanding the size of the frame to cover at least a portion of the area of the interface components. The method further includes executing the feature, wherein the feature renders a visual content within the expanded frame and disables the interface components within the expanded frame. The method further includes responsive to a second request, reducing the size of the expanded frame to an initial size of the frame.

Also described herein are embodiments of a non-transitory computer readable medium comprising instructions to be executed in a computer system, wherein the instructions when executed in the computer system perform the method described above for adjusting a size of a frame (HTML document) within a webpage having a shell with interface components that are displayed in an area outside the frame.

Also described herein are embodiments of a system, wherein software for the computer system is programmed to execute the method described above for adjusting a size of a frame (HTML document) within a webpage having a shell with interface components that are displayed in an area outside the frame.

BRIEF DESCRIPTION OF THE DRAWINGS

FIG. 7 illustrates an example of code for expanding and shrinking the window of the IFrame area, according to some embodiments.

DETAILED DESCRIPTION

Figure 1:
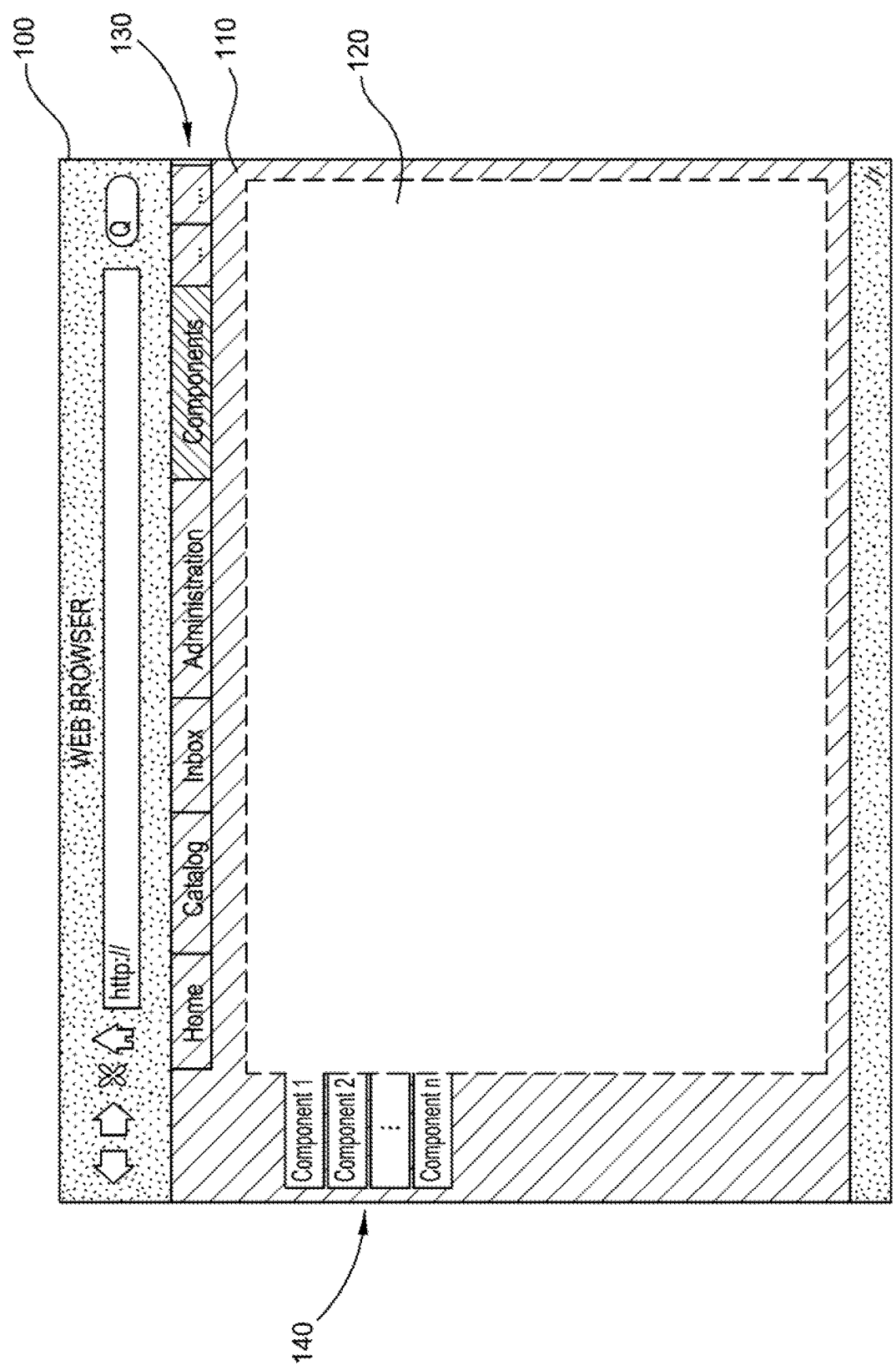
FIG. 1 illustrates an example of a shell component within a user interface (UI) of a webpage, according to some embodiments.

As described above, IFrame is a feature introduced by HTML version 4.0 that provides a convenient way to embed external content, including third party UIs or web pages, in a designated area. FIG. 1 illustrates an example browser 100 showing a webpage including shell 110 as well as a designated IFrame or IFrame area 120. As described above, HTML version 4.0 allows independently developed UIs to be composed at deploy or run time into shell 110. Shell 110 handles navigation, authentication and general UI flow. For example, shell 110 provides navigation elements 130 and 140 around IFrame area 120 that enable a user to navigate through various external content or webpages that may be embedded in IFramed area 120. As described above, shell 110 also provides IFrame area 120 which is where shell 110 allows an IFrame component, such as external or third-party content (e.g., UIs), to be rendered or plugged in. For example, a gadget of a third party news site may be embedded within IFrame area 120. As described above, in some cases, the content within IFrame area 120 is sandboxed to provide security. Sandboxing is an attribute that may be enabled for adding a certain set of restrictions on how a browser treats external content that is plugged into IFrame area 120. The sandboxing restrictions result, among other things, in the IFramed content not being allowed to render any visual content outside of IFrame area 120.

Figure 2:
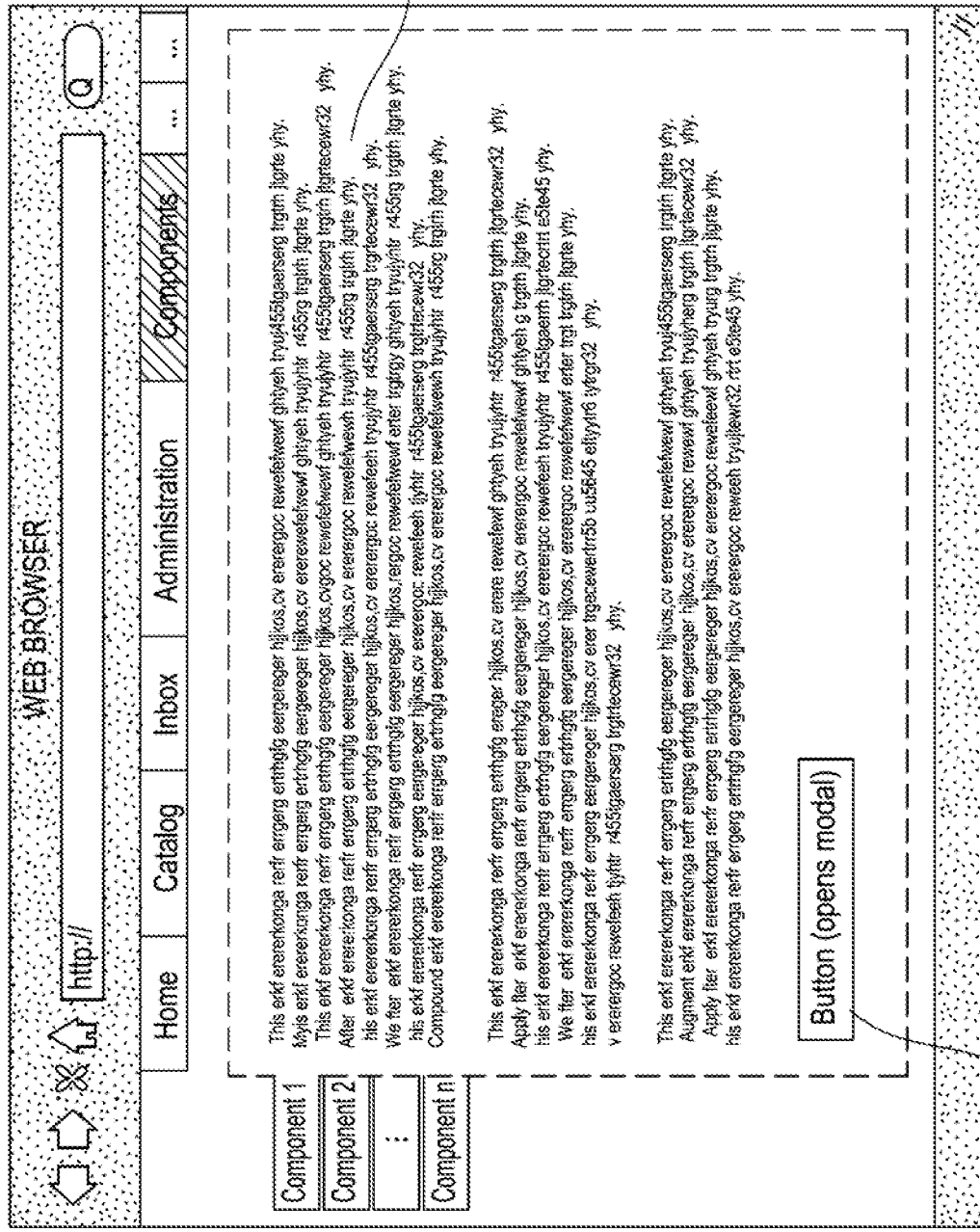
FIG. 2 illustrates an example of a multi-component integration of an external UI within an IFrame area, according to some embodiments.

FIG. 2 shows an example of content being embedded within IFrame area 120. As described above, content 224 may be any external UI or web page including HTML content, video, images, text, etc. As shown in FIG. 2, in its current state, embedded content 224 is flat and can, therefore, fit into the designated IFrame area 120. However, execution of one or more features of the content may require breaking out of the designated IFrame area. As an example, FIG. 2 shows button 222, which triggers the execution of a feature of content 224. For example, the feature may be a visual component, such as a pop-over window (e.g., modal window 324 shown in FIG. 3), that may appear in response to a user clicking on button 222. Upon the execution of the feature, IFramed content 224 may need to break out of the designated IFrame area 120, which shell 110 is configured to restrict because of sandboxing.

Figure 3:
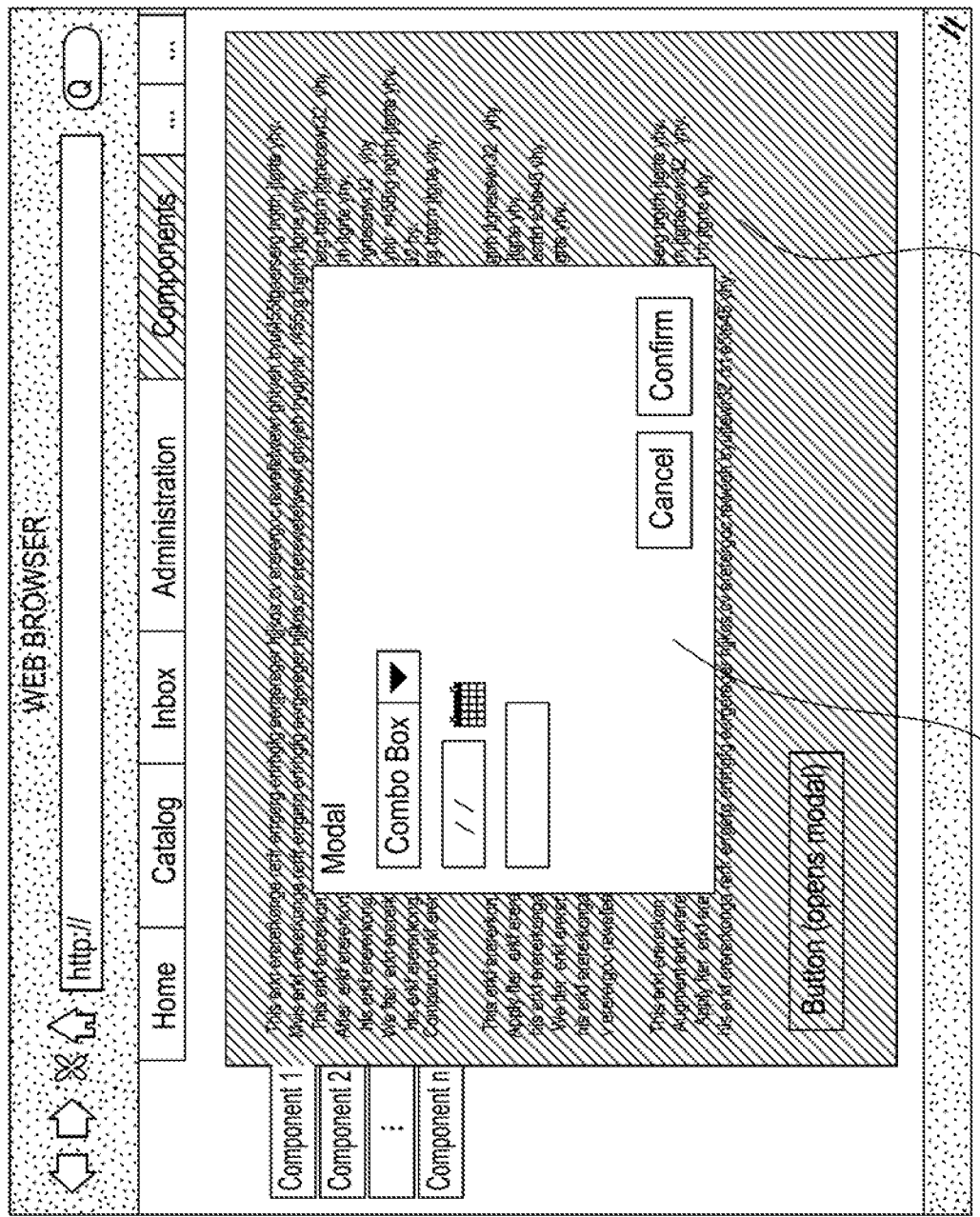
FIG. 3 illustrates an example backdrop of a modal that is instantiated from the external UI of FIG. 2 and constrained within the IFrame area, according to some embodiments.

FIG. 3 illustrates an example of when the embedded content of FIG. 2 needs to break out of IFrame area 120 but is being restricted because of sandboxing. FIG. 3 shows modal 326, which is a graphical control element that appears as a result of clicking on button 222, as described above. Modal 326 is usually placed on top of all visible components of a webpage to grab the user's attention when asking for the user's input. However, unlike what is shown in FIG. 3, a modal is generally paired with a backdrop component that fades the entire webpage (i.e., shell 110 as well as IFrame area 120) underneath it while also keeping the webpage visible. For example, the backdrop covers and disables all other elements of the UI to draw the attention of the user. As a result, users must interact with the modal before they can return to the parent application (i.e., content 224). But, as shown in FIG. 3, because of sandboxing, backdrop 328, associated with modal 326, is constrained within IFrame area 120 and is not able to cover or disable the entire webpage, including the shell 110. This results in modal 326 not being able to accomplish its intended functionality of fading and disabling the entire webpage while asking a user for input.

Similar to modal 326 shown in FIG. 3, other features within an external IFramed content, including pop-over UIs, may also need to break out of IFrame area 120 but be disallowed and constrained. Generally, within an HTML-based webpage, HTML elements (e.g., non-popover elements) are rendered in a <body> tag and, if not specified otherwise, all their positions are relative to the position of the body. The HTML <body> tag defines the main content of the HTML document or the section of the HTML document that will be directly visible on the web page. For example, when the body of the external webpage or content is rendered inside of IFrame area 120, as shown in FIG. 3, the corresponding HTML elements are positioned relative to the position of the body as well. In contrast, pop-over elements (e.g., modal window 326) are generally rendered with a fixed position, which is a Cascading Style Sheets (CSS)-specific style. This means that in a webpage without an IFrame, pop-over elements are positioned relative to the webpage's window (i.e., the borders or outer boundaries of the webpage), not the body of the webpage. In the case of an IFrame, pop-over elements are similarly rendered with a fixed position relative to the window of the IFrame area (e.g., shown as IFrame area window 550 in FIG. 5), not the top level window (the window of the shell (e.g., shown as shell window 560 in FIG. 5)), which is why the backdrop of modal 326 is also constrained within the IFrame window, as shown in FIG. 3.

As described above, limiting various privileges of IFramed content and restricting certain actions it may perform may be especially advantageous when embedding content from a third party source. However, in some cases, the shell (e.g., shell 110) as well as the external UI or content (e.g., content 224) being embedded within the IFrame area (e.g., IFrame area 120) are served by the same domain. For example, the external content may be developed by a different team, in a separate code repository, for representing a specific functionality of a certain product but all components of the web page (i.e., the shell and the external content in the IFrame area) may still be served by the same domain. In such embodiments, a better visual experience may be provided to the user if the external content is allowed to break out of the designated IFrame area when it needs to.

Accordingly, certain embodiments described herein relate to enabling the embedded IFramed content to render visual component(s) outside the designated IFrame area or break out of it.

As described above, IFramed pop-over elements (e.g., modal 326) are rendered with a fixed position relative to the window of IFrame area 120, not the top level window (e.g., parent window or the window of the shell/webpage). Accordingly, in the embodiments described herein, in order to allow external IFramed content to break out of the IFrame area (e.g., IFrame area 120), the size of the IFrame area is temporarily expanded such that it would cover the entire webpage or shell area. For example, in some embodiments, web browser 100 is configured to expand the size of IFrame area 120 to cover the entire webpage (i.e., parent window/shell) when IFramed content 224 needs to break out of IFrame area 120 (such as when a pop-over element is executing) and shrink or reduce the size of IFrame area 120 back to its original size and position (i.e., original coordinates on the webpage) after the execution of the pop-over element.

Figure 4:
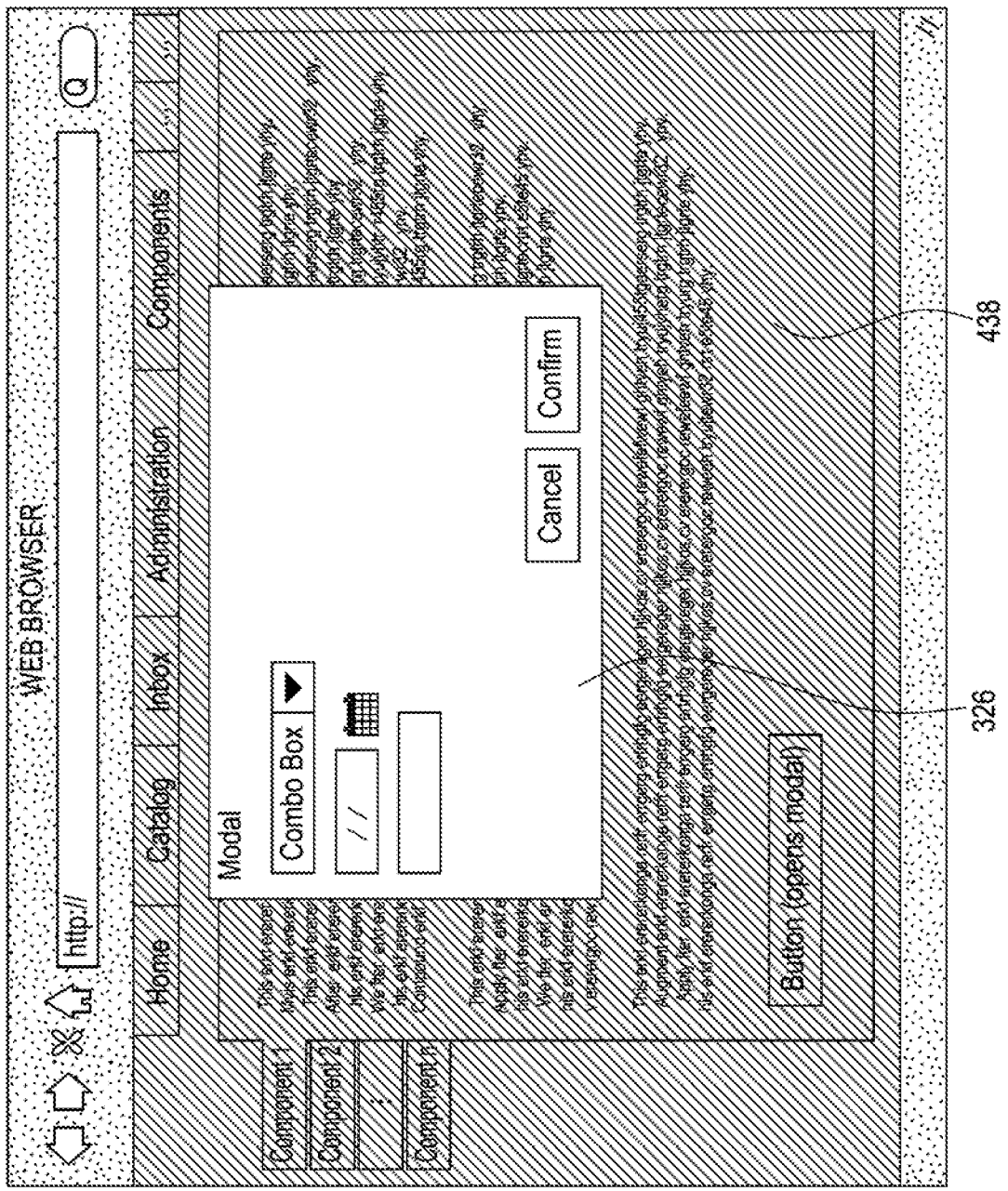
FIG. 4 illustrates an example backdrop of the modal of FIG. 4 that has broken out of the IFrame area and covering the shell as well as the IFrame area, according to some embodiments.

FIG. 4 shows a visual example of what results from temporarily expanding the size of the IFrame area when, for example, web browser 100 is executing a visual component that requires breaking out of IFrame area 120. As described above, in some embodiments, the visual component is a modal (e.g., modal 326) or another pop-over element. As shown, backdrop 428 paired with modal 326 has faded the entire webpage including the shell. Accordingly, implementing the embodiments described herein allow a visual component or feature (e.g., modal 326) to accomplish its intended functionality even though the feature is associated with content that is embedded within an IFrame area. For example, in embodiments where the visual component is a modal (e.g., modal 326), implementing the embodiments described herein allow backdrop 428 to fade the entire webpage and, therefore, accomplish modal 326's intended functionality of grabbing the user's attention when asking for the user's input.

Figure 5:
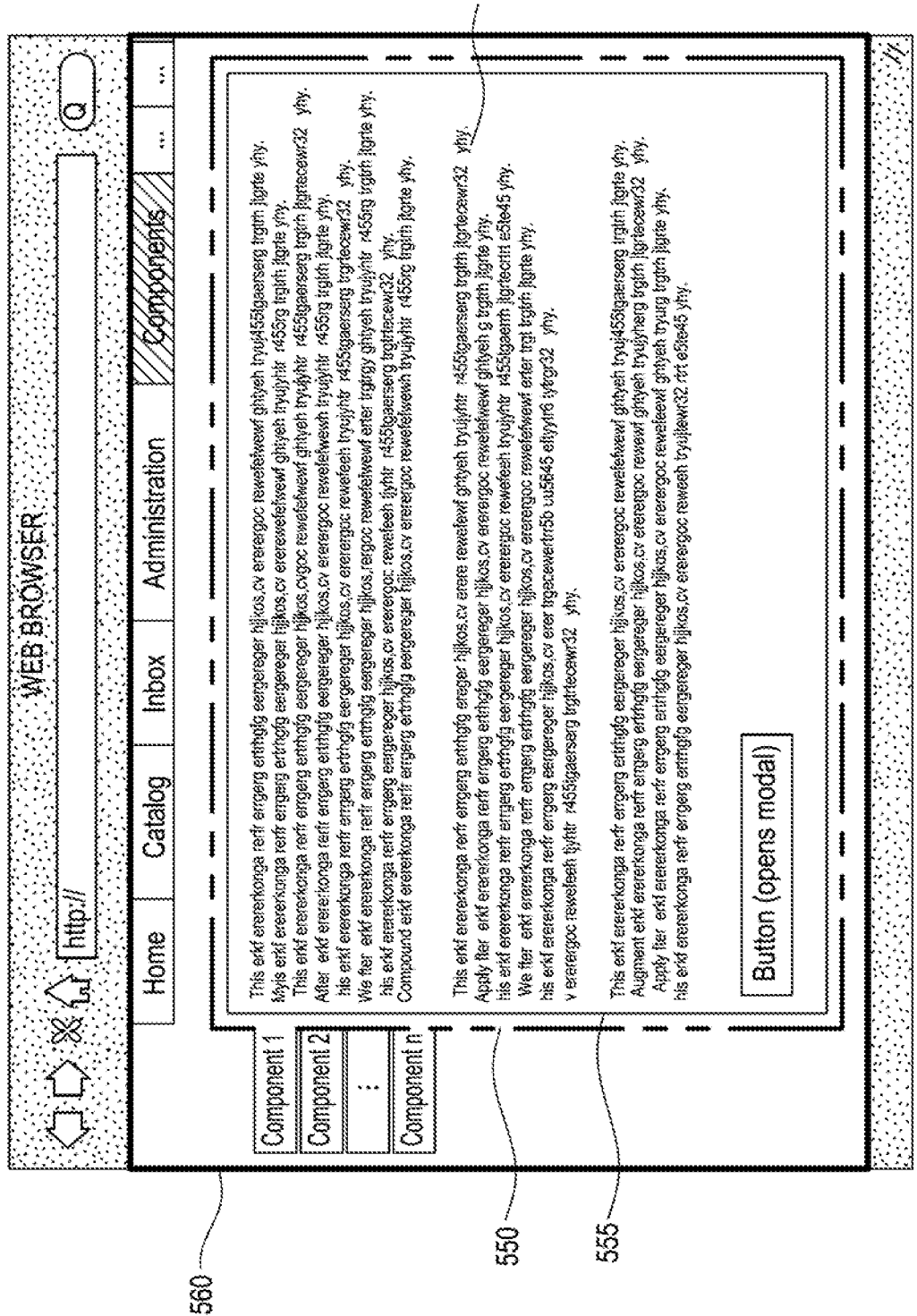
FIG. 5 illustrates example windows of a shell, IFrame area, and IFrame body in their original state, according to some embodiments.
Figure 6:
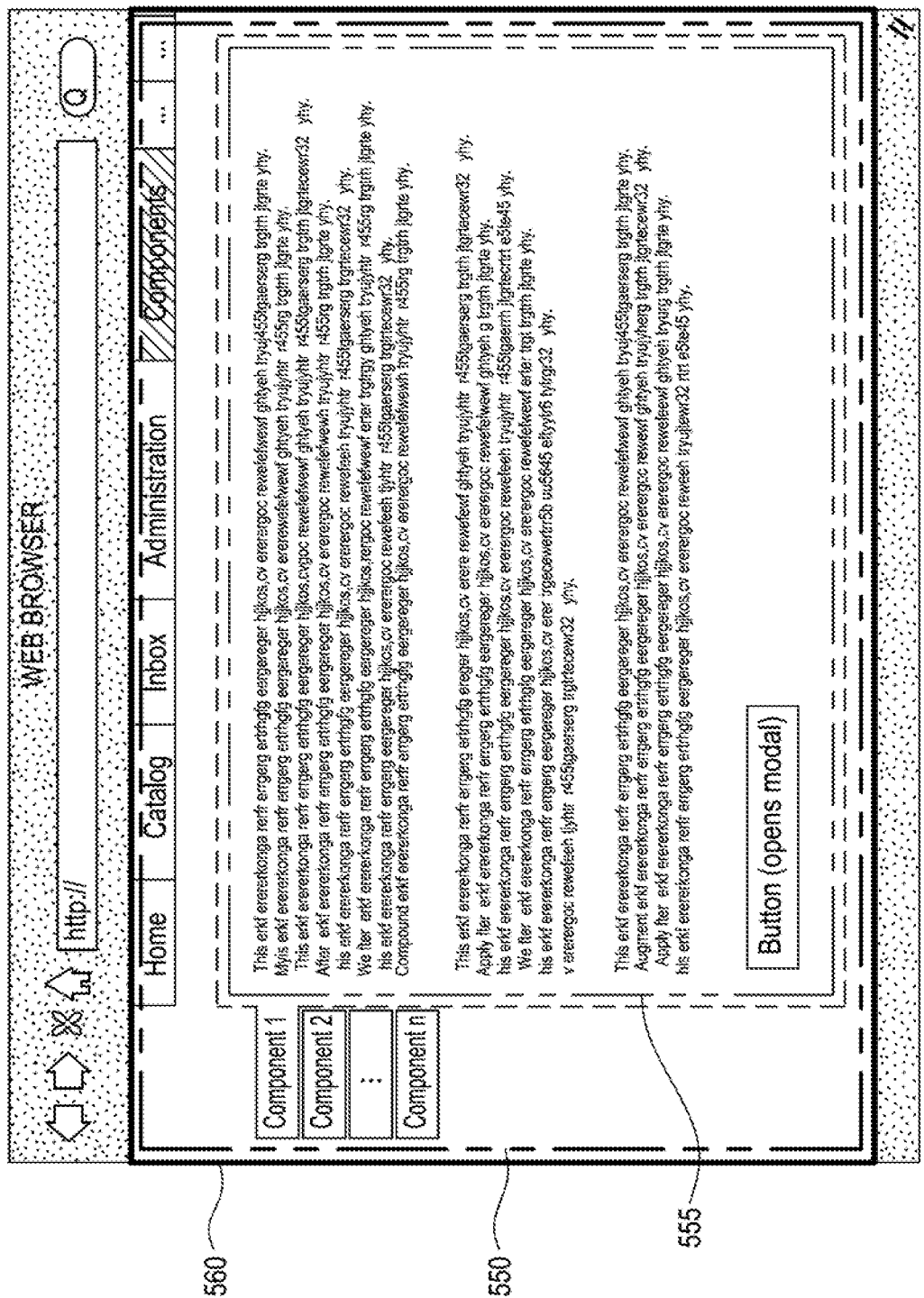
FIG. 6 illustrates example window of the IFrame area expanding to cover the same area covered by the area of the shell, according to some embodiments.

FIGS. 5 and 6 illustrate the size of the IFrame area before and after expansion, respectively. More specifically, FIG. 5 illustrates IFrame area window 550, corresponding to the original size and outer boundaries of the IFrame area within which any external content may be rendered (e.g., IFrame area 120), as well as IFrame body window 555, corresponding to the size of the body of the external webpage or IFramed content. FIG. 5 also illustrates shell window 560 corresponding to the outer boundaries of the area covered by shell 110 (i.e., area covered by the entire webpage). In the embodiments of FIG. 5, the browser is configured (e.g., when, for example, the code shown in FIG. 7 is integrated with the IFrame application running within the browser) such that, in response to receiving a request for executing a feature (e.g., modal 326) of the IFramed content (e.g., content 224), IFrame area window 550 expands in size to cover the same area as the area of shell 110, therefore, allowing one or more features (e.g., modal 326) of to break out of the original IFrame area designated for the body of the external webpage or content.

FIG. 6 illustrates expanded IFrame area window 650 of IFrame area 120 (having the same size as shell window 560) that fully captures the area of shell 110, enabling the rendering of any pop-over element all over the webpage. It is important to note that windows 550, 555, 560, and 650, shown in FIGS. 5 and 6, as well as any change in the size or position of borders 550, 555, 560, and 650 are not displayed or visible to a user and are merely used here for illustrating the embodiments described herein.

The embodiments described above for expanding and shrinking the size of IFrame area 120 are applicable to any external content, such as an external UI. When applied to pop-over elements, it is important to first determine when the IFramed content needs to break out of the IFrame area and also determine when it needs to shrink back so that the IFrame window may accordingly expand and shrink in size. For example, in some embodiments, pop-over elements (e.g., modals or dropdowns) appear and disappear in response to user action. As an example, a pop-over element may execute and appear in response to a user clicking on a button featured by the UI within the IFrame area (e.g., button 222). Similarly, the pop-over element may disappear and close down in response to the user clicking on a button or inputting some information. Accordingly, in such embodiments, the web browser expands the IFrame area in size, in response to user action that leads to the execution and appearance of the pop-over element (e.g., user clicking on a button), and subsequently shrinks the size of the IFrame area back to its original size in response to, for example, user action that leads to the disappearance and closing down of the pop-over element (e.g., user inputting info or clicking on a button) or, in another example, in response to the pop-over element itself disappearing or closing down.

In some other embodiments, a pop-over element may execute and appear and subsequently close down and disappear in response to an HTTP request or similar browser events. Accordingly, in such embodiments, the IFrame area expands in size in response to an HTTP request (or similar browser events) that leads to the execution and appearance of the pop-over element and subsequently shrinks back to its original size in response to, for example, another HTTP request (or similar browser events) that leads to the disappearance and closing down of the pop-over element or, in another example, in response to the pop-over element itself disappearing or closing down.

In some embodiments, the expanding and shrinking of the size of the IFrame area may be allowed as long as the external content is in the same web domain. In such embodiments, for example, if the external content is from a domain that is different than the domain of the webpage that the web browser is executing, the web browser is configured not to adjust the size of the IFrame area window. This is because allowing external content from a different domain to operate outside of the IFrame area may, in some cases, pose security risks that external content from the same domain may not.

In some embodiments, the code corresponding to expanding and shrinking the size of the IFrame area may be in JavaScript, an example of which is shown in FIG. 7. The embodiments described above are compatible with all security constraints introduced by the World Wide Web Consortium and applicable to all modern browsers. For example, the script shown in FIG. 7 is compatible with all security constrains because all content (within and outside the IFrame area) in a UI suite, where the script is executed, is served by the same domain, as described above. The embodiments described above are also framework agnostic, as they may be applied to plain HTML and JavaScript applications as well as any JavaScript framework.

Figure 8:
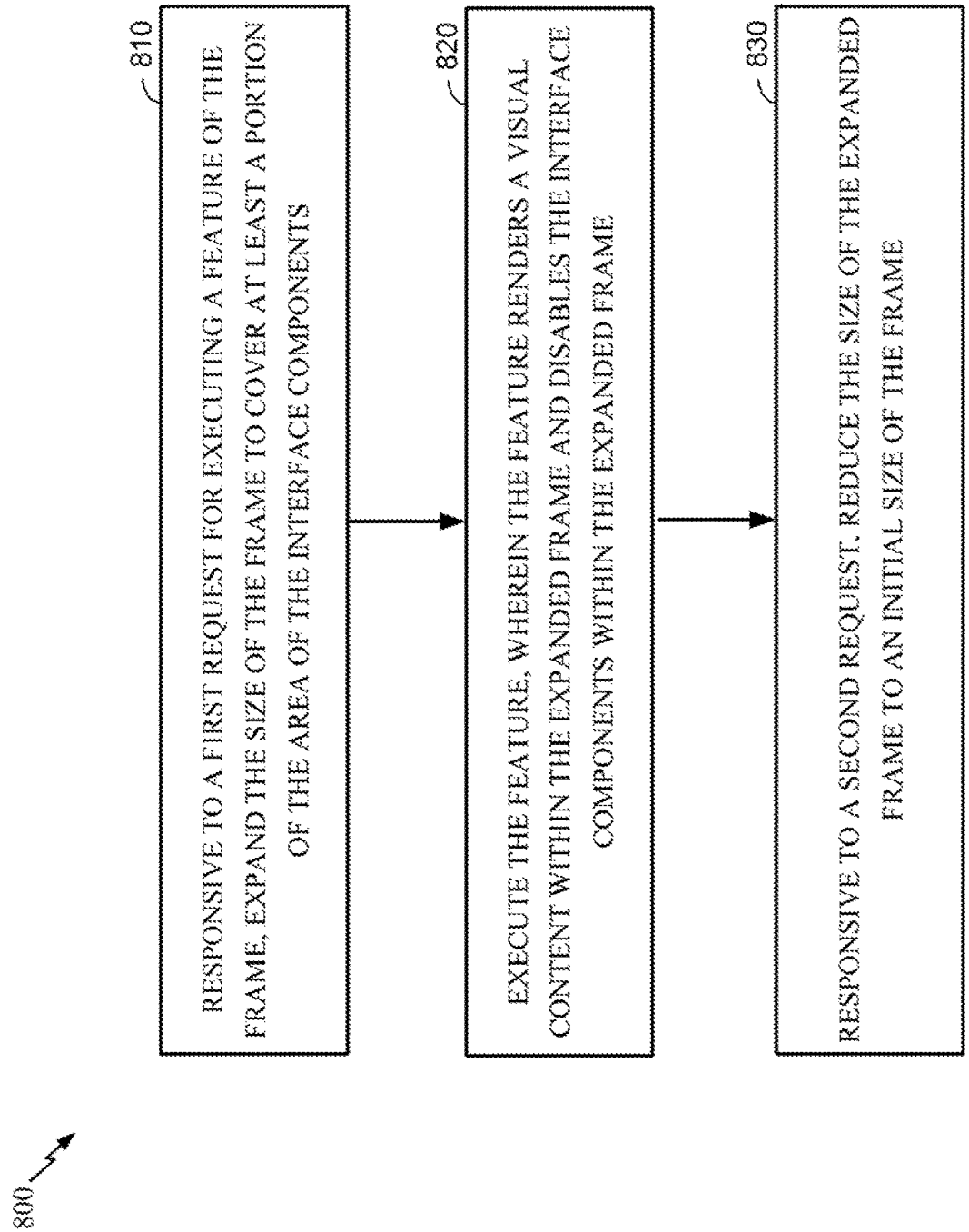
FIG. 8 illustrates example operations for use by a web browser for adjusting a size of an IFrame area within a webpage, according to some embodiments.

FIG. 8 illustrates example operations 800 for use by a web browser for adjusting the size of an IFrame (HTML document) within a webpage having a shell with interface components that are displayed in an area outside the frame. Steps 810-830 of operations 800 are described below by reference to FIGS. 1-7.

At 810, responsive to a first request for executing a feature of the IFrame, expanding the size of the IFrame to cover at least a portion of the area of the interface components. As described above, the web browser (e.g., web browser 100) executes a webpage including a shell (e.g., shell 110) and an IFrame (e.g., IFrame area 120) for embedding and constraining a content (e.g., content 224). Content may be any external content having a feature (e.g., modal 326) whose execution requires rendering visual content (e.g., backdrop 428) outside of the body of the IFramed content. As described above, in some embodiments, web browser 100 receives a request for executing the feature of the external content (i.e., feature of the frame). In some embodiments, the request may be received through user-action using a trigger such as button 222, shown in FIG. 2. For example, a user may click on button 222 of content 224, which indicates to web browser 100 that the feature (e.g., modal 326) needs to be executed. In some other embodiments, the request may be a HTTP request. Upon receiving the request, web browser 100 expands the IFrame area window (e.g., IFrame area window 550) in size to cover the entire or at least a larger portion of the webpage (e.g., shown as IFrame area window 650). An example of this is shown in FIG. 6.

At 820, web browser 100 executes the feature, wherein the feature renders visual content within the expanded IFrame or IFrame area and disables the interface components in the area. For example, after the IFrame area window is expanded in size (e.g., IFrame area window 650), web browser 100 executes modal 326, allowing it to render visual content (e.g., backdrop 428) within the expanded IFrame area and disable some or all components within the expanded IFrame area (e.g., navigation elements 130 and 140 and other interface components in the area of shell 110). An example of this is shown in FIG. 4.

At 830, responsive to a second request, the web browser reduces the size of the expanded IFrame area to an initial size of the IFrame area in order to constrain the content. As described above, in some embodiments, the request may be received through user-action and, in some embodiments, the request may be an HTTP request. Upon receiving the request, the web browser reduces the size of the IFrame area window to its initial state, as shown in FIG. 5.

It's important to note that the embodiments described herein apply to any frame (HTML document) that operates similar to IFrame and is embedded within a webpage. As such, IFrame is merely used as an example in the embodiments described herein.

Figure 9:
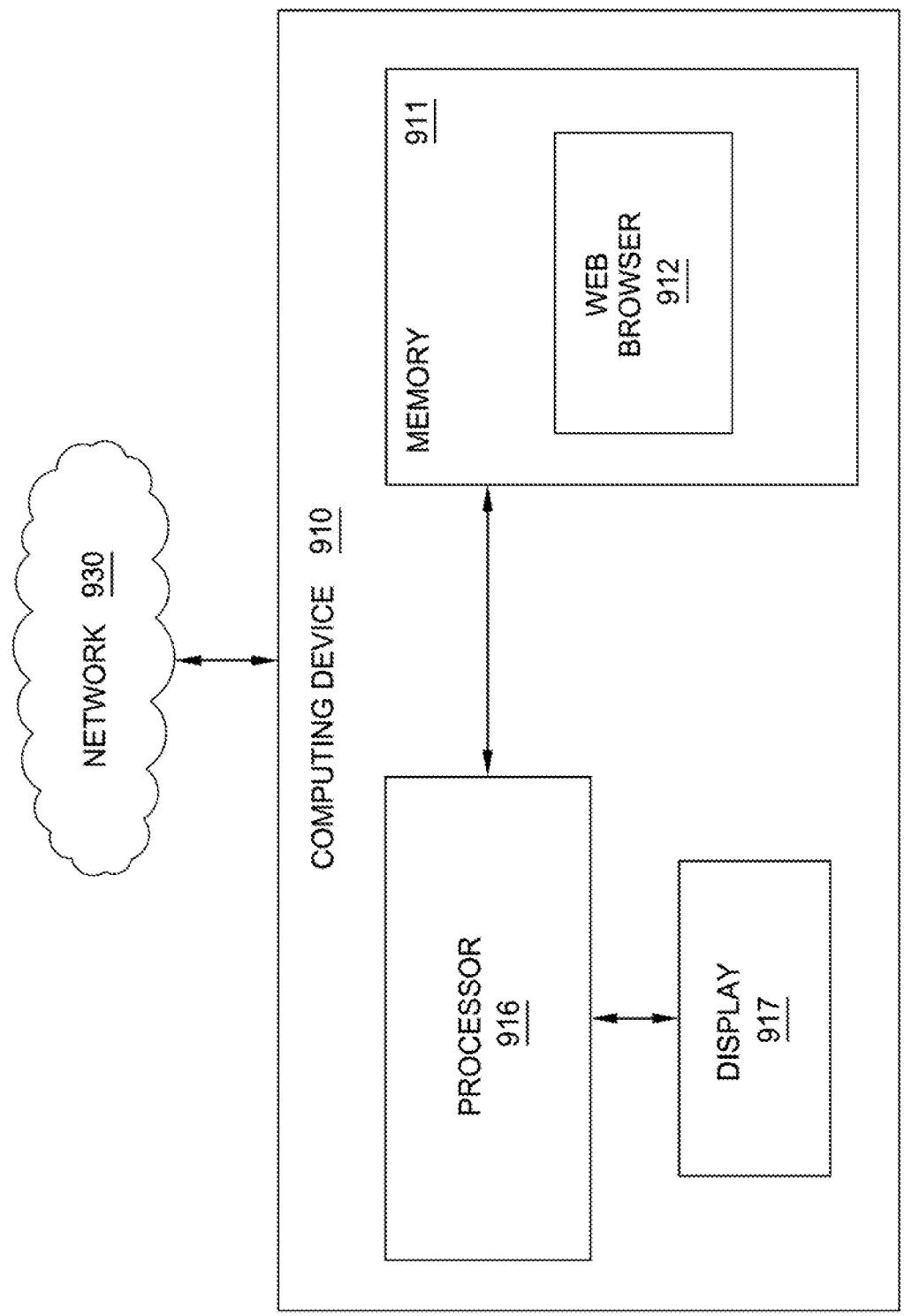
FIG. 9 illustrates an example computer device, in accordance with some embodiments, according to some embodiments.

FIG. 9 illustrates an example of a computing device 910 for implementing the embodiments described above. Computing device 910 is representative of a variety of computing devices, such as a computer (e.g., a desktop computer, personal computer) that may also be used as a server. As shown, computing device 910 includes processor 916, memory 911, and display 917. Display 117 may be any hardware display of a computing device such as a computer display for displaying the UI of a webpage being executed by, for example, a web browser application such as web browser 912.

Processor 919 may be a microprocessor or a similar hardware processor used in a computing device. According to FIG. 9, processor 919 may access memory 911 to store received input or to execute commands, processes, or programs stored in memory 911. Memory 911 is a non-transitory hardware storage device capable of storing commands, processes, and programs for execution by processor 919. As shown in FIG. 9, memory 911 stores web browser 912, which is a software application for retrieving, presenting and traversing information resources on the Internet (e.g., network 930). As described above, web browser 912 may be configured to execute code, such as web-related code (e.g., JavaScript and HTML-related code, such as code shown in FIG. 8) for a variety of webpages. For example, in some embodiments, web browser 912 executes code relating to the embodiments described herein.

Computer device 910 is also connected to network 930, which may be a network of computers such as a local area network ("LAN"), a wide area network ("WAN"), or a network of networks, such as the Internet. In some embodiments, computer device 910 is connected to a server through network 930 for receiving data, including UI-related code and instructions corresponding to the embodiments described herein, which is then executed by web browser 912.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

I claim:

1. A method of adjusting a size of an inline frame (IFrame) within a webpage having a shell with interface components that are displayed in an area outside the frame, the method comprising:
    responsive to a first request for executing a feature of the IFrame, expanding, by a web browser, the size of the IFrame to cover at least a portion of the area of the interface components;
    executing, by the web browser, the feature, wherein the feature renders a visual content within the expanded IFrame and disables the interface components within the expanded frame IFrame; and
    responsive to a second request, reducing, by the web browser, the size of the expanded IFrame to an initial size of the IFrame,
    wherein each of the first and the second requests comprises at least one of a request generated through user-action, a hypertext transfer protocol (HTTP) request, or a browser event, and
    wherein the IFrame and the webpage are from a single domain.

2. The method of claim 1, wherein the feature comprises a pop-over element.

3. The method of claim 1, wherein the feature comprises a modal.

4. The method of claim 3, wherein the visual content comprises a backdrop.

5. The method of claim 1, wherein the expanded IFrame covers the entire area of the interface components.

6. The method of claim 1, wherein the visual content covers the entire area of the interface components and the feature disables all the interface components in the entire area.

7. A non-transitory computer readable medium comprising instructions to be executed in a computer system, wherein the instructions when executed in the computer system perform a method for adjusting a size of an inline frame (IFrame) within a webpage having a shell with interface components that are displayed in an area outside the frame, the method comprising:
    responsive to a first request for executing a feature of the IFrame, expanding, by a web browser, the size of the IFrame to cover at least a portion of the area of the interface components;
    executing, by the web browser, the feature, wherein the feature renders a visual content within the expanded IFrame and disables the interface components within the expanded IFrame; and responsive to a second request, reducing, by the web browser, the size of the expanded frame to an initial size of the IFrame, wherein each of the first and the second requests comprises at least one of a request generated through user-action or a hypertext transfer protocol (HTTP) request, or a browser event; and wherein the IFrame and the webpage are from a single domain.

8. The non-transitory computer readable medium of claim 7, wherein the feature comprises a pop-over element.

9. The non-transitory computer readable medium of claim 7, wherein the feature comprises a modal.

10. The non-transitory computer readable medium of claim 9, wherein the visual content comprises a backdrop.

11. The non-transitory computer readable medium of claim 7, wherein the expanded Iframe covers the entire area of the interface components.

12. The non-transitory computer readable medium of claim 7, wherein the visual content covers the entire area of the interface components and the feature disables all the interface components in the entire area.

13. A system for adjusting a size of an inline frame (IFrame) within a webpage having a shell with interface components that are displayed in an area outside the frame, the system comprising:

a non-transitory memory; and a hardware processor running a web browser, wherein the web browser is configured to:

responsive to a first request for executing a feature of the IFrame, expanding the size of the IFrame to cover at least a portion of the area of the interface components;

executing the feature, wherein the feature renders a visual content within the expanded frame and disables the interface components within the expanded IFrame; and responsive to a second request, reducing the size of the expanded IFrame to an initial size of the IFrame, wherein each of the first and the second requests comprises at least one of a request generated through user-action or a hypertext transfer protocol (HTTP) request, or a browser event, and wherein the IFrame and the webpage are from a single domain.

14. The system of claim 13, wherein the feature comprises a pop-over element.

15. The system of claim 13, wherein the feature comprises a modal.

16. The system of claim 15, wherein the visual content comprises a backdrop.

17. The system of claim 16, wherein the expanded IFrame covers the entire area of the interface components.

18. The system of claim 13, wherein the visual content covers the entire area of the interface components and the feature disables all the interface components in the entire area.

\* \* \* \* \*